J. S. EATON.
POTATO DIGGER.
APPLICATION FILED SEPT. 13, 1915.

1,201,447.

Patented Oct. 17, 1916.
2 SHEETS—SHEET 1.

Inventor
J. S. Eaton

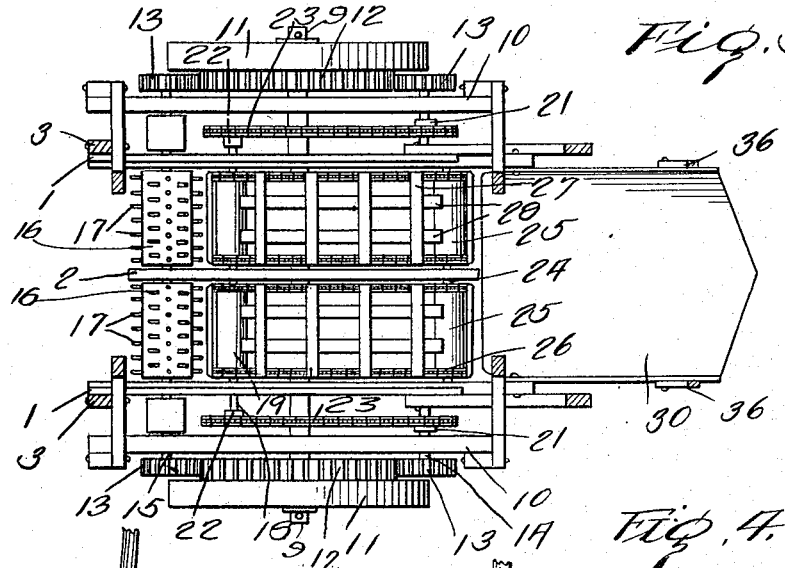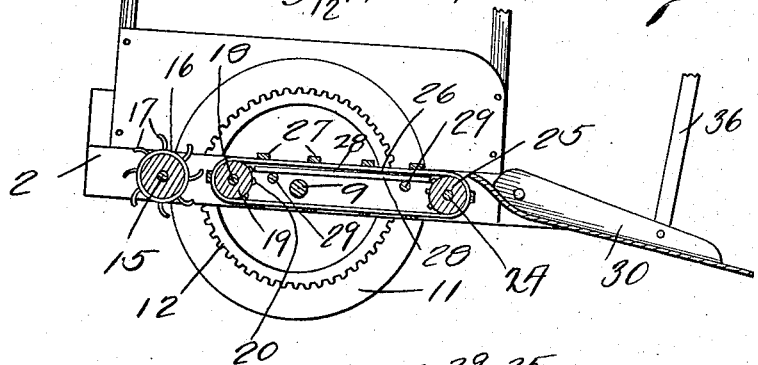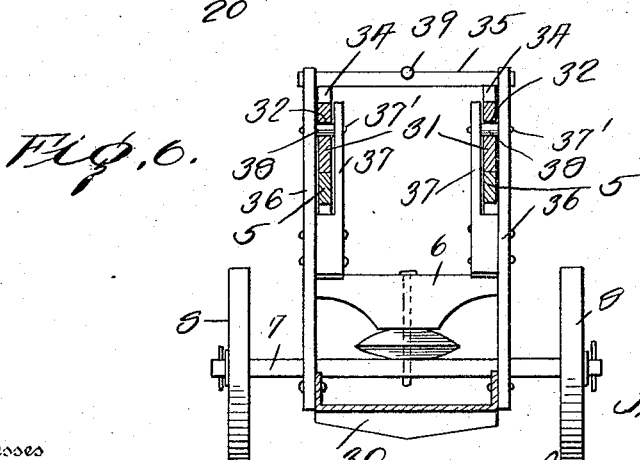

UNITED STATES PATENT OFFICE.

JACOB S. EATON, OF SMITHVILLE FLATS, NEW YORK.

POTATO-DIGGER.

1,201,447.   Specification of Letters Patent.   Patented Oct. 17, 1916.

Application filed September 13, 1915. Serial No. 50,448.

*To all whom it may concern:*

Be it known that I, JACOB S. EATON, a citizen of the United States, residing at Smithville Flats, in the county of Chenango, State of New York, have invented certain new and useful Improvements in Potato-Diggers; and I do hereby declare the following to be a full, clear, and exact description of the invention, such as will enable others skilled in the art to which it appertains to make and use the same.

The present invention is directed to improvements in potato diggers, and has for its object to construct a device of this character capable of digging the potatoes during the travel of the machine across a field, after which the dug potatoes are agitated so as to remove the dirt therefrom.

A further object of the invention is to provide a potato digger having a digging scoop so mounted that the same may be raised or lowered, as desired, whereby potatoes planted at different depths may be dug.

With these and other objects in view, this invention resides in the novel features of construction, formation, combination and arrangement of parts to be hereinafter more fully described, claimed and illustrated in the accompanying drawing, in which:—

Figure 1:
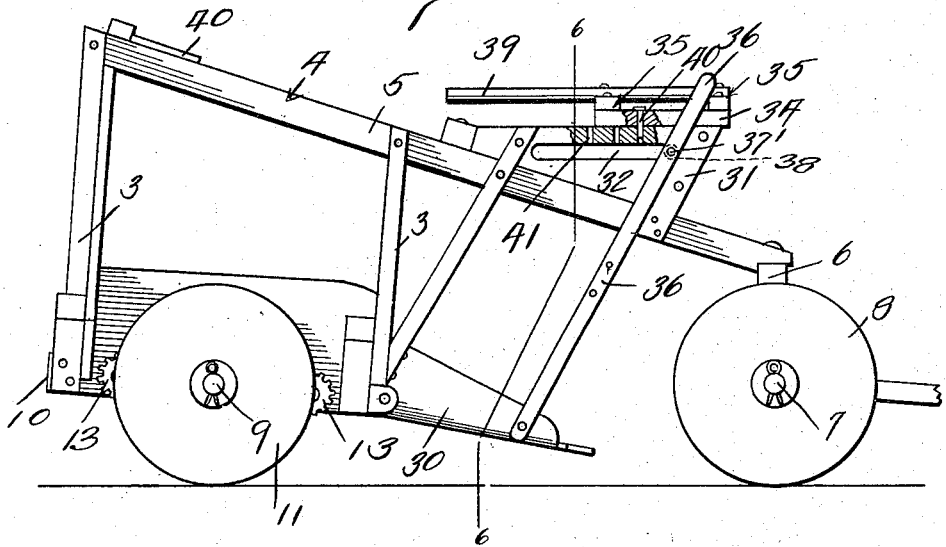
Figure 2:
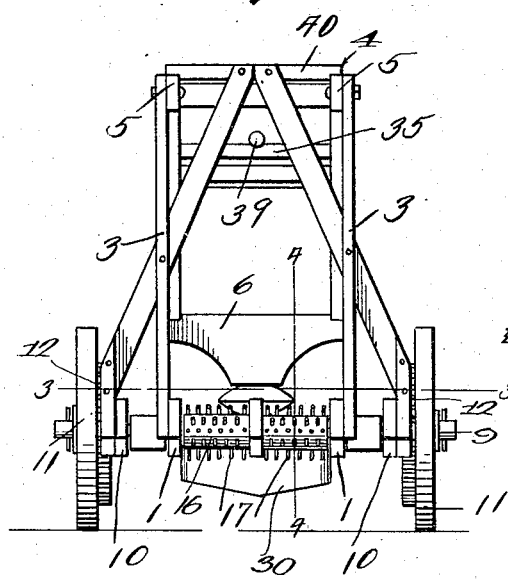
Figure 5:
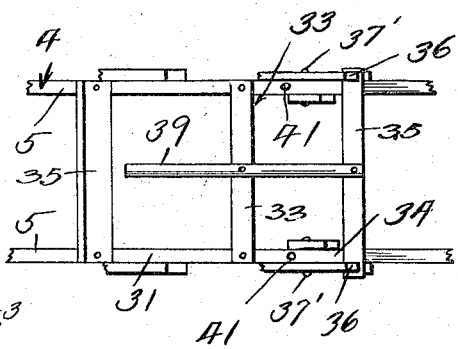

Figure 1 is a side elevation of the machine. Fig. 2 is a rear elevation of the same. Fig. 3 is a sectional view on line 3—3 of Fig. 2. Fig. 4 is a sectional view on line 4—4 of Fig. 2. Fig. 5 is a top plan view of the scoop adjusting frame. Fig. 6 is a similar view on line 6—6 of Fig. 1.

Referring to the drawing 1 indicates a pair of spaced side sills, and 2 an intermediate sill. Fixed to each side sill 1 are the lower ends of the vertical bars 3, said bars supporting at their upper ends a frame 4, the side bars 5 of which are inclined downwardly and have their forward ends connected by a cross bar 6, to which is pivotally connected the front axle 7, which is provided with ground wheels 8.

Journaled in the sills 1 and 2 is a shaft 9, the ends of which extend beyond the side sills 1 and through the sills 10, which are spaced from the sills 1, said shaft having mounted on its outer ends ground wheels 11, which have their inner faces provided with gears 12. Meshing with the gears 12 are gears 13, which are supported by the shafts 14 and 15. The shafts 14 are journaled in the sills 1 and 10, while the shafts 15 are journaled in the sills 1, 2 and 10, and have fixed thereto a plurality of bands 16, which are provided with fingers 17, the purpose of which will appear later. The shafts 15 are provided with bands only on those portions between the sills 1 and 2.

Shafts 18 are provided and have their ends journaled in the sills 1 and 2, and fixed to said shafts are cylinders 19, the opposite ends of which are provided with teeth 20. Fixed to the shafts 14 are sprocket wheels 21 which are alined with the sprocket wheels 22 fixed to the outer ends of the shafts 18, said sprocket wheels being connected by sprocket chains 23, whereby when rotary movement is imparted to the shafts 14 similar movement will be imparted to the shafts 18, and thus the cylinders 19.

Supported between the sills 1 and 2 are rods 24 which have rotatably mounted thereon rollers 25, and trained around the rollers 25 and teeth 20 are endless chains 26. The chains 26 are connected by transverse strips 27 which slide over the slatted platform 28, which is supported on rods 29.

Hingedly connected to the forward ends of the sills 1 is a rear end of a scoop 30, which is adapted to dig the potatoes when the machine is propelled across the field.

Mounted on the side bars of the frame 4 is a frame 31, the side bars of which are provided with longitudinal slots 32. Slidably supported by the frame 31 is a frame 33, which consists of side bars 34 and end bars 35, the ends of the forward bar 35 being slidably engaged by the upper ends of the links 36, the lower ends of which are pivotally connected to the scoop 30. The links 36 have extension bars 37 mounted on their inner surfaces, said extensions serving to guide the links and to support the inner ends of the pins 37', the same being engaged in the slots 32. Mounted on the pins 37' are anti-friction rollers 38, which are movable in the slots 32. Thus it will be seen that the frame 33 is permitted to slide freely longitudinally of the frame 31, but is prevented from moving laterally thereon.

A handle 39 is connected to the bars 35, and may be grasped by the operator on the seat 40 to move the frame, thereby raising or lowering the scoop 30.

By providing the intermediate sill 2 the chains 26 are arranged in pairs so that the machine will dig a double row of potatoes.

It is obvious that the potatoes will travel upon the scoop 30, and from thence to the platform 28 and will be carried thereover by the strips 27. As the potatoes travel over the platform they will be agitated so as to remove the dirt therefrom, after which they will fall to the bands 16 and will be acted upon by the fingers carried thereby. Movement is imparted to the chains 26 by the sprocket chains 23, which are driven by the shafts 14 which carry the gears 13. Rotary movement is imparted to the shafts 15 by the gears 13 carried thereby, which mesh with the gears 12 carried by the ground wheels 11, To hold the frame 33 in adjusted position, pins 40 are provided, and are removably engaged in the bars 34, said pins being adapted to engage a selected perforation in the side bars of the frame 31.

What is claimed is:—

1. A potato digger comprising spaced sills, a scoop hingedly connected to the forward ends of the sills, a frame supported by the sills, a second frame mounted thereon, a slidable frame mounted on the second frame, means pivotally connecting the scoop and sliding frame, and means for shifting the sliding frame to raise or lower the scoop.

2. A potato digger comprising spaced sills, slatted platforms arranged between the sills, endless chains traveling around the platforms, transverse strips connecting the chains, means for imparting movement to the chains, a scoop hingedly connected to the forward ends of the sills, a frame supported by the sills, a second frame mounted thereon, a slidable frame mounted upon the second frame, links connecting the scoop and sliding frame, and means for shifting the sliding frame to raise or lower the scoop.

In testimony whereof, I affix my signature, in the presence of two witnesses.

JACOB S. EATON.

Witnesses:
A. J. GIBSON,
F. B. OLIVER.

Copies of this patent may be obtained for five cents each, by addressing the "Commissioner of Patents, Washington, D. C."